(12) United States Patent
Weiner et al.

(10) Patent No.: US 7,974,534 B2
(45) Date of Patent: Jul. 5, 2011

(54) WIDEBAND MICROWAVE AND MILLIMETER WAVE FILTERS USING PHOTONIC SPECTRAL FILTERING

(75) Inventors: Andrew M. Weiner, West Lafayette, IN (US); Shijun Xiao, Boulder, CO (US)

(73) Assignee: Purdue Research Foundation, West Lafayette, IN (US)

( * ) Notice: Subject to any disclaimer, the term of this patent is extended or adjusted under 35 U.S.C. 154(b) by 932 days.

(21) Appl. No.: 11/891,152

(22) Filed: Aug. 9, 2007

(65) Prior Publication Data

US 2009/0297155 A1 Dec. 3, 2009

Related U.S. Application Data

(60) Provisional application No. 60/837,206, filed on Aug. 11, 2006.

(51) Int. Cl.
*H04J 14/02* (2006.01)
*H04B 10/12* (2006.01)
*H04B 10/04* (2006.01)

(52) U.S. Cl. .......... 398/85; 398/95; 398/149; 398/196; 398/198

(58) Field of Classification Search .............. 398/33, 398/81, 85, 93, 95, 147–149, 196, 198
See application file for complete search history.

(56) References Cited

U.S. PATENT DOCUMENTS

| | | | |
|---|---|---|---|
| 7,362,927 B1 * | 4/2008 | Ilchenko et al. | 385/15 |
| 7,460,746 B2 * | 12/2008 | Maleki et al. | 385/27 |
| 2004/0008401 A1 * | 1/2004 | Szczepanek et al. | 359/290 |
| 2008/0013163 A1 * | 1/2008 | Leonardo et al. | 359/341.31 |
| 2009/0122816 A1 * | 5/2009 | Wagner et al. | 372/20 |

* cited by examiner

*Primary Examiner* — Dalzid Singh
(74) *Attorney, Agent, or Firm* — Brinks Hofer Gilson & Lione

(57) ABSTRACT

An apparatus and method is disclosed for producing and filtering optical and electrical waveforms. The apparatus includes an electro-optical modulator, an optical filter capable of modulating at least two spectral regions within the bandwidth of the electrical waveform, and an optical-to-electrical converter. The optical filter includes a spatial dispersion means, a spatial modulating means having the capability to substantially independently modulate a characteristic of each of a pair of optical spatial elements.

45 Claims, 12 Drawing Sheets

(a)

(b)

(c)

(d)

(a)

(b)

(c)

(d)

(a)

(b)          (c)

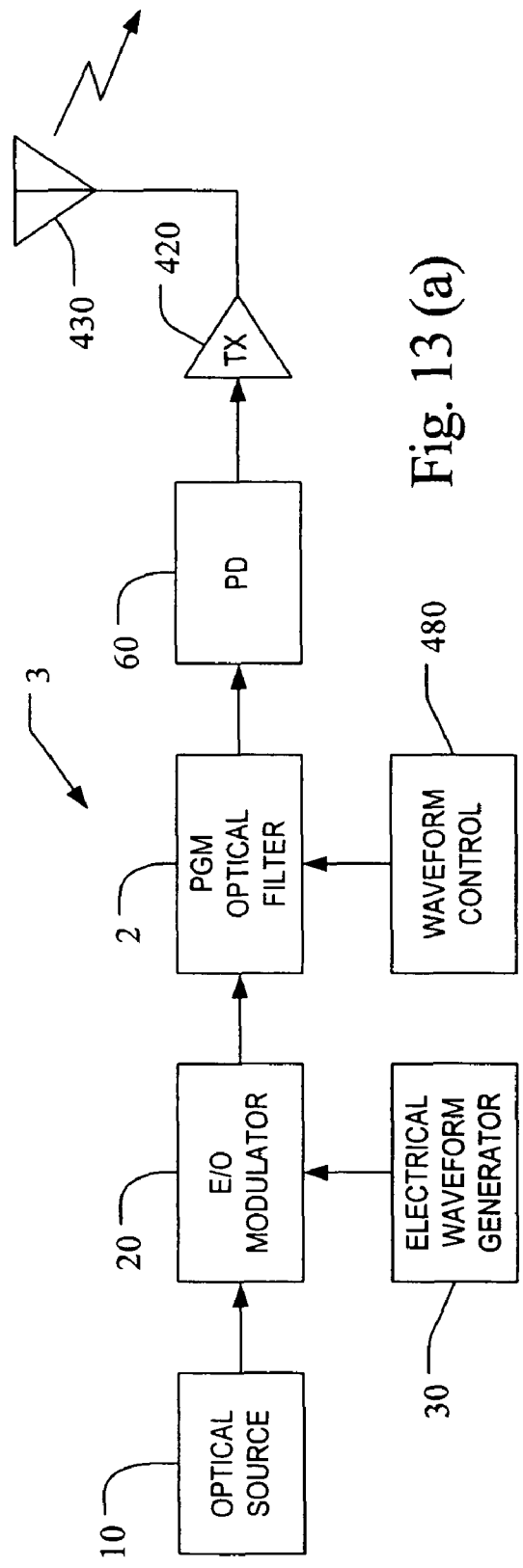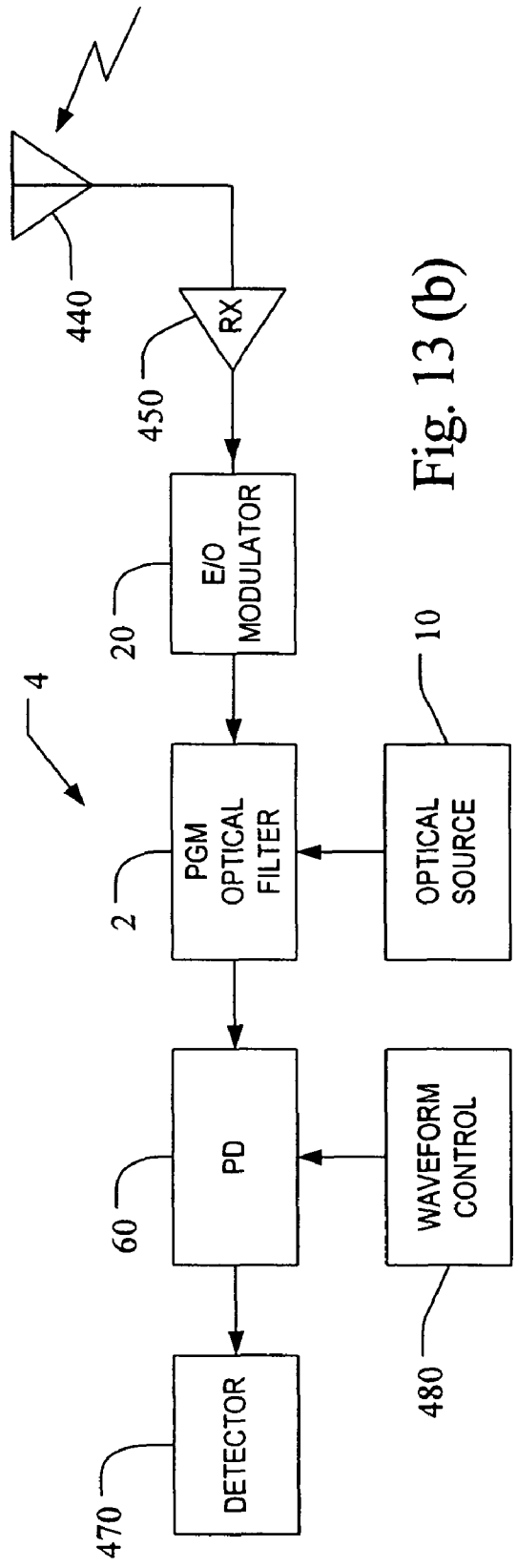
Fig. 13 (a)
Fig. 13 (b)

WIDEBAND MICROWAVE AND MILLIMETER WAVE FILTERS USING PHOTONIC SPECTRAL FILTERING

This application claims the benefit of U.S. Provisional application No. 60/837,206, filed on Aug. 11, 2006, which is incorporated herein by reference.

FEDERALLY SPONSORED RESEARCH OR DEVELOPMENT

The work described in this application was sponsored in part by the U.S. Army Research Office under Grant No. DAAD19-03-1-0275.

TECHNICAL FIELD

This application relates to an apparatus and method of optical filtering to produce filtered electrical signals.

BACKGROUND

Photonically-realized microwave filters are known. Compared to purely electronic implementations, photonic microwave filters have wider operating bandwidth, better reconfigurability, and immunity to electromagnetic interference. A high frequency electrical signal is used to drive an electro-optic modulator, which imposes the electrical signal onto an optical carrier wave. The resulting optical signal is manipulated by photonic techniques and then directed to an optical-to-electrical converter to return to the electrical domain. Both finite impulse response (FIR) and infinite impulse response filters (IIR) may be constructed using this methodology.

Previous approaches to the optical signal processing employ a tapped delay-line architecture, resulting in a discrete-time filter. Individual taps are implemented with technologies such as fiber delay lines and fiber Bragg gratings. The photonic processing works in an incoherent regime, where the differences in the tap time delays exceed the laser coherence time; as such, optical powers, rather than vector fields, add. This approach mitigates vulnerability to environmental fluctuations but severely restricts realizable filter functions due to intrinsic positive coefficients for the delay taps. In particular, only low-pass filters are possible, filter flatness cannot be optimized, sidelobes are often high, and general phase functions cannot be realized. In many designs, multiple lasers at different wavelengths are required in order to achieve incoherence. Operation in the incoherent optical regime usually restricts the filter free-spectral-range (FSR) to several GHz or below. Filters that operate in the optical incoherent regime but realize negative tap coefficients via differential electrical detection have been reported. However, these solutions retain other general disadvantages of the tapped delay line approach, including limited reconfigurability and high complexity

SUMMARY

A wideband filter is described, including an electro-optical modulator configured to accept light energy from a continuous-wave laser source and a electrical waveform from an electrical modulating signal source. The modulator imposes a representation of the waveform of the electrical signal source onto an optical signal by one or more of, for example, amplitude modulation, phase modulation, or a combination thereof.

The modulator may be configured, for example, to modulate the optical signal to achieve optical double sideband (O-DSB), with partial carrier suppression if desired, and an optical blocking filter may be used to select a single optical sideband (O-SSB). Optical filter technology may be used to manipulate a selected sideband so as to manipulate the optical spectral amplitude, spectral phase, or both. The blocking filter and the optical filter technology may be combined.

The optical filter technology may be an optical pulse shaper based, for example, on virtually-imaged phased array (VIPA) technology, and used for amplitude and phase filtering of the selected optical sideband in the optical frequency domain. Alternatively, other optical filtering technologies may be employed, such as optical filtering based on micro-optical ring resonator arrays that are programmable using thermo-optic effects.

The resulting filtered optical signal may be mixed with a narrowband optical local oscillator (LO) to yield a desired electrical signal when detected by an optical-to electrical (O/E) converter, which may be a high-speed photodetector or photodiode. The optical LO may be generated by passing the laser signal directly through the same optical pulse shaper as the selected optical sideband, by using a portion of the original laser signal obtained prior to the electro-optical modulator, or by using a second, independent, narrowband laser. The achieved electrical filtering function corresponds to a coherent optical filtering and detection function. An optical amplifier may optionally be incorporated in order to reduce overall device insertion loss.

A programmable optical spectral filter may be used, having programmable pulse shaper technology in combination with optical wavelength demultiplexing technology. Direct manipulation of phase and amplitude in the optical domain may result in realization of flexible filtering functions, including high-pass, band-pass, multiple-band-pass, and flat-top filters with narrow skirts and low sidelobes. The optical spectral filter may be programmable and implemented directly in the optical Fourier-transform domain.

Spectral-phase filters using photonically-realized filters may permit, for example, chirp compression and matched filtering of radio frequency signals, and other filter operations with simultaneous and independently programmable control of spectral phase and amplitude. Spectral-phase filters may also permit time delay shifting (typically known as true-time delay) of wide-band and ultra-wide-band radio-frequency signals.

The ability to realize easily reconfigurable spectral filters over a broad band may permit interference excision, both for communications and for radar. Also, notch filters may be formed simultaneously at multiple frequencies to, for example, excise interfering signals, with independent control over both of the individual notches and of the passbands therebetween.

Wideband and ultra-wideband (UWB) signals may be generated for transmission and processing by a receiver. For a fixed transmit energy, the power spectral density scales inversely with bandwidth; consequently, the ability to process extremely broad bandwidths may yield improvements in resistance to jamming and low probability of intercept. Distortions associated with the antenna phase responses, which may result in distortion of the radio frequency signal in the time domain may be compensated by programmable spectral phase filter to optimize receiver signal amplitudes and signal-to-noise ratio.

BRIEF DESCRIPTION OF THE DRAWINGS

FIG. 13(a) shows a radio transmitter, and FIG. 13(b) shows a radio receiver, where the signal generation and signal detection is performed by photonic spectral filtering

DETAILED DESCRIPTION

Reference will now be made in detail to several examples. While the claimed invention will be described in conjunction with these examples, it will be understood that it is not intended to limit the claimed invention to such examples. In the following description, numerous specific details are set forth in the examples in order to provide a thorough understanding of the subject matter of the claims which, however, may be practiced without some or all of these specific details. In other instances, well known process operations and apparatus have not been described in detail in order not to unnecessarily obscure the description. When a specific feature, structure, or characteristic is described in connection with an example, it will be understood that one skilled in the art may affect such feature, structure, or characteristic in connection with other examples, whether or not explicitly stated herein.

The terms frequency, wavelength, bandwidth and time have well known relationships to each other, and the use of a description in one domain is not intended to particularize the discussion to a specific domain, as will be appreciated by a person of skill in the art.

Waveforms, signals and filter characteristics are described in both the optical and electrical domain. That is, the frequency, phase, and temporal characteristics may be described equivalently in the optical frequency range and the electrical frequency range. Signals in one domain may be converted into signals in the other domain by both known techniques and those described herein. When a signal is described in the electrical domain, the signal may be described as an electrical signal, or by reference to a generic range of electrical frequencies, such as microwave, millimeter wave, and the like. The electrical signal may be associated with signals in electronic equipment, which may have lumped circuit or distributed circuit components, and may have both passive and active components. The electrical signal of the same frequency and characteristics may be radiated as an electromagnetic wave by an antenna, as is known in the fields of telecommunications and radar, for example.

Unless specifically limited to a domain or frequency range, optical and electrical signals may be interchanged and be of any frequency. For example, a microwave network analyzer may actually have an operating frequency range of essentially DC (but usually about 50 MHz) to 20 or 40 GHz, and encompass not only the microwave frequency range, but the very high frequency (VHF) and ultra-high-frequency range (UHF), as well as part of the millimeter wave frequency range.

Figure 1A:
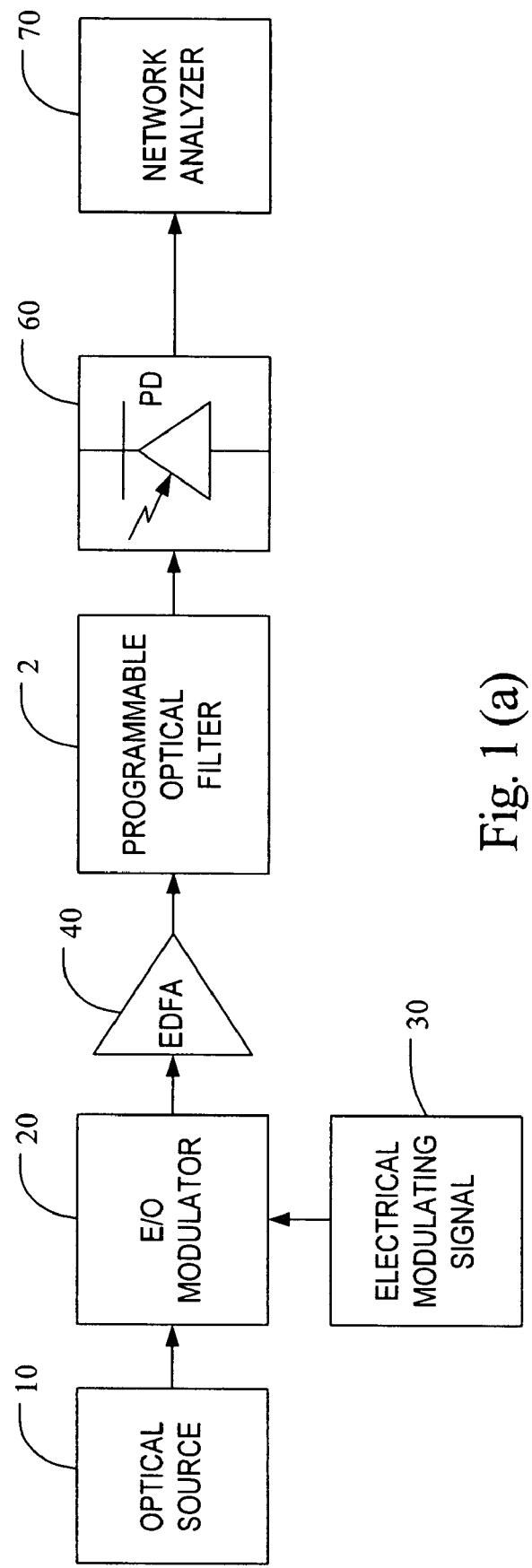
FIG. 1 (a) shows an experimental setup for photonic processing of microwave signals, and (b) photonic sideband processing.
Figure 1:
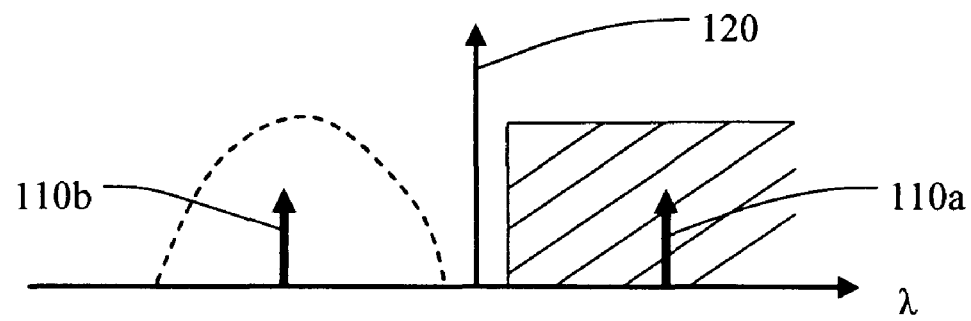

As shown in FIG. 1A, a continuous wave (CW) optical carrier from a coherent optical source 10 such as a laser, which may be a semiconductor laser or other laser, such as a fiber laser, may be passed through an electro-optical modulator 20, and the modulator may be driven by an electrical waveform which may be, for example, a radio frequency (RF) microwave input signal from a signal generator 30 or other source. The electro-optical modulator 20 may be a Lithium Noibate (LiNbO3) or other phase shifting device, an electroabsorption modulator (EAM) using, for example, an Indium Phosphide (InP) or quantum-confined Stark effect (QCSE) device, an acousto-optical device, or other means of controlling at least one of the amplitude or phase of an optical signal in response to an applied electrical signal. The electro-optical modulator may be configured as a Mach-Zehnder (MZ) interferometer acting as an optical intensity modulator, or other configuration for imposing an amplitude or phase shift on the optical signal. The optical source and the optical modulator may be combined in a single device. Where individual components are described, there is no intention to suggest that components may not be otherwise combined or subdivided so as to perform the same function. The choice of level of detail in this description is merely intended to facilitate the description herein.

The output of the electro-optical modulator 20 may be applied to an electro-optical (E/O) detector 60, which may be a photodiode, so as to convert the optical intensity into an electrical waveform, which may be measured by a network analyzer 70 or used in an application such as a radar, a telecommunications system, or the like. One or more optical amplifiers 40 which may be Erbium-doped fiber amplifiers (EDFA), semiconductor optical amplifiers (SOA), or the like, may be used to adjust the amplitude of the optical signal or compensate for losses in the apparatus.

The output of the modulator 20 may be coupled into the programmable optical filter 2 and filtered optical signal may be coupled out of the programmable optical filter 2 by an optical circulator 210.

For simplicity of presentation, the input microwave signals are often represented as single-frequency tones, and may be generalized to signals having finite bandwidth spectra. A person of skill in the art will recognize that the properties of the device may be characterized using such a single-frequency tone swept in frequency and monitored by, for example, a spectrum analyzer or a network analyzer.

The components are shown substantially co-located but, for example, the electro-optical modulator and the optical filter, and the optical filter and the electro-optical converter, may be separated, and may not be located at the same site. The connection between the various components may be by way of optical fiber, optical waveguides, or by free-space propagation.

The modulator 20 optical output may have a double-sideband format (110a, 110b). Optical filtering may suppress one sideband (e.g., 110a) while passing the carrier 120 and the other sideband (110b), as shown in FIG. 1B. The amplitude of the remaining sideband may be manipulated by the programmable optical filter 2. The resultant optical signal may be converted to an electrical signal by heterodyne or homodyne beating with an optical carrier using a fast photodiode 60 for coherent optical-to-electrical conversion. Coherent (strong carrier) detection may be described as homodyne or heterodyne detection, depending of the frequency relationship of the strong carrier signal to the sideband signal. The signal may also be incoherently detected when there is no carrier. Intermediate situations are also possible.

When an electrical signal is applied to an arm of the Mach-Zehnder interferometer used as a modulator 20, the output optical field E(t) may be described by $$E(t) \propto \mathrm{Re}\{e^{j\omega_c t} + e^{j[\omega_c t + \delta + \pi A\, \cos(\Omega t)/V_\pi]}\} \quad (1)$$

where Re{ } indicates the real part, $\omega_c$ is the optical carrier frequency, $\delta = \pi V_b/V_\pi$ is the phase shift caused by the DC bias $V_b$, $V_\pi$ is the minimum transmission voltage parameter of the modulator, and $A \cos(\Omega t)$ is the input electrical signal.

The electrical signal is shown as a tone of a constant amplitude and frequency for simplicity in presentation. As will be evident to a person of skill in the art, the input signal may be represented by a Fourier transform of the signal spectrum, or other analytical function, or be band limited noise.

For small signal modulation, equation (1) may be expanded in a Taylor series, the second and higher order terms ignored, and $$E(t) \propto \mathrm{Re}\left\{[e^{j\omega_c t} + e^{j(\omega_c t + \delta)}] + j\frac{\pi A}{2V_\pi}e^{j(\omega_c t + \Omega t + \delta)} + j\frac{\pi A}{2V_\pi}e^{j(\omega_c t - \Omega t + \delta)}\right\} \quad (2)$$

When an optical filter, such as the programmable optical filter 2 of FIG. 1A, suppresses one sideband while modifying the amplitude of the remaining sideband, $$E(t) \propto \mathrm{Re}\left\{[e^{j\omega_c t} + e^{j(\omega_c t + \delta)}] + j\gamma(\omega_c + \Omega)\frac{\pi A}{2V_\pi}e^{j(\omega_c t + \Omega t + \delta)}\right\} \quad (3)$$

where $\gamma(\omega_c + \Omega)$ represents the frequency-dependent complex amplitude transmission coefficient of the optical filter. In general, the frequency-dependent transmission coefficient of the optical filter may be a complex variable. The filtering may result in modification of the amplitude, the phase, or both, of the optical signal. In an example, the higher frequency (shorter wavelength) sideband may be chosen; however, either one of the two sidebands may be chosen. The carrier may be either suppressed, or not, depending on the application.

The photodiode (PD) current output is $$i(t) \propto I(t) \propto \langle E^2(t)\rangle_{\omega_c} \propto \quad (4)$$
$$2\cos^2(\delta/2) + \frac{1}{2}\left[\gamma_m(\Omega)\frac{\pi A}{2V_\pi}\right]^2 - \cos(\delta/2)\gamma_m(\Omega)\frac{\pi A}{2V_\pi}\sin(\Omega t + \delta/2)$$

where i(t) is the PD current and I(t) is the optical intensity averaged over the oscillations of the optical carrier. The PD is assumed to be linear with respect to incident optical power and the detector current is proportional to the input light intensity. The current may be converted to a voltage waveform in a trans-impedance amplifier. The voltage signal may consist of a DC component as well as a filtered AC signal. For the AC signal, equation (4) represents an amplitude filter with a spectral response $\gamma_m(\Omega) = \gamma(\omega_c + \Omega)$.

According to equation (4), a sufficient condition to have a non-zero signal i(t) is that $\cos(\delta/2)$ is not equal to zero, and $\delta = \pi V_b/V_\pi$ is not an odd multiple of $\pi$. As such, a non-zero optical carrier intensity is maintained at the modulator output.

Experimental Apparatus

A tunable laser with line width of less than about 0.1 pm (~12.5 MHz) was used as the coherent optical input signal 10. A Mach-Zehnder (MZ) optical-intensity modulator 20 with an electrical −3 dB passband of greater than 30 GHz was used to modulate the microwave signal onto the optical signal. The modulator 20 had a single electrode input and a $V_\pi$ of about 5.0 Volts. An input microwave tone was swept from 0.05 GHz to 20.05 GHz (instrumental limit) with a step size of 0.05 GHz and a constant RF power level of −5 dBm, corresponding to a voltage of 0.18 volts for 50Ω impedance ($\pi A/V_\pi = 0.11$). The modulator 20 was biased for double sideband modulation with partial carrier suppression, and the carrier 120 was maintained at approximately the same power level as the modulation sidebands (110a, 110b).

After being amplified by an Erbium-doped fiber amplifier 40 (EDFA) to a total power of about 5 dBm, the signal was passed through the programmable optical filter 2. The optical filter output may be a single sideband signal with or without a carrier, and with an unwanted sideband suppressed by the optical filter 2 by greater than about 25 dB (in this apparatus, for sideband frequencies >~0.6 GHz displaced from the carrier). A second EDFA 40 was used to amplify the optical power into the fast photodiode 60, which had an electrical −3 dB bandwidth of ~60 GHz. The electrical signal was recovered by heterodyne detection in the fast PD 60, and the output electrical signal was measured by a network analyzer 70.

Figure 2:
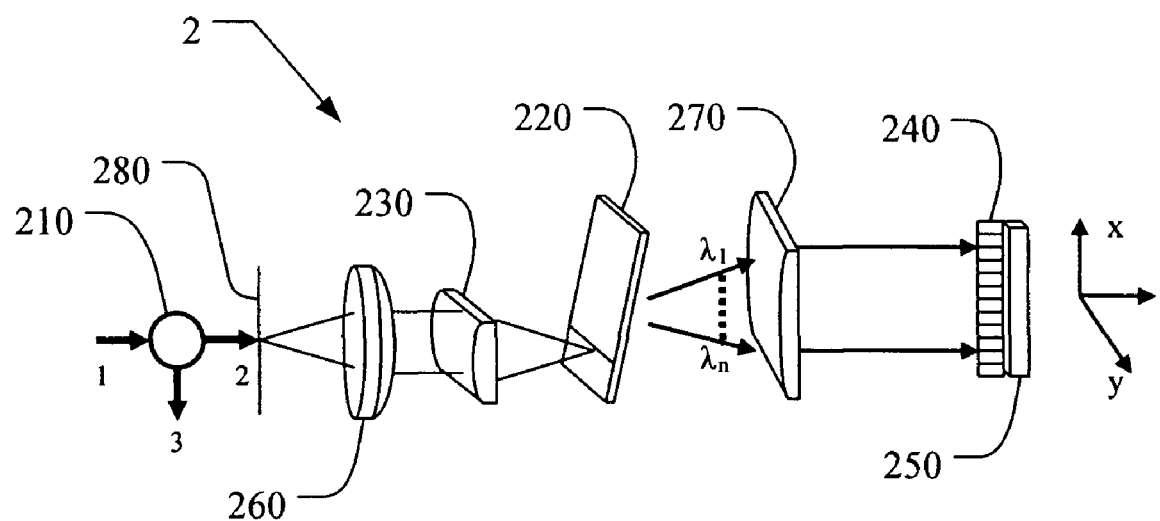
FIG. 2 shows a programmable coherent optical filter based on a virtually-imaged phased-array.

FIG. 2 shows a programmable optical filter 2, using a reflective geometry pulse shaper, where a virtually-imaged phased-array (VIPA) was used as the optical spectral disperser; however, an optical grating or other optical spectral dispersion means may be used. The VIPA used had a free-spectral-range of 50 GHz (0.4 nm) at 1.55 um, and provided an angular dispersion ≧3 deg/nm as well as a narrow bandwidth when used as a de-multiplexing filter (−3 dB bandwidth of ~0.7 GHz at 1.55 um).

In the apparatus of FIG. 2, the input was linearly polarized in an x-axis direction and incident on the VIPA 220 with ~2.5 deg offset angle. The input optical frequency components were dispersed by the VIPA 220 and focused by a cylindrical lens 270 with a focal length of 300 mm. A programmable spatial light modulator (SLM) 240 was placed at the back focal plane of the focusing lens 270. The liquid crystal SLM 240 comprised 128 pixels (N=1 to N=128), with a pixel-to-pixel spacing of 100 um. A flat mirror 250 close to the SLM 240 reflected the light that again passed through the SLM 240. To produce amplitude modulation, a polarizer 280 was inserted between the collimator 260 and the cylindrical lens 230 preceding the VIPA 240. The SLM 240 may be programmed to rotate a linearly x-polarized input to a linearly y-polarized output after a double-pass through the SLM 240, so an "off" state results when the return light passes through the polarizer. States between "on" and "off" may be generated (that is, gray-level amplitude states) as desired, by programming the SLM 240. The reprogramming speed depends on the SLM response, which, in the experimental apparatus used, was on the order of tens of milliseconds. This reprogramming speed may be scalable down to perhaps milliseconds for other liquid crystal displays used in pulse shaping. It is expected that the performance of SLM devices will improve in response time, resolution and related properties. Other devices such as MEMS optics may be used.

The optical signal is discussed herein as being dispersed in one spatial dimension by, for example a VIPA or a diffraction grating. A combination of dispersion techniques may be used so as to disperse the optical signals in two substantially orthogonal directions, so that a SLM having a two-dimensional structure, such as is typical of liquid crystal modules, which are typically used in displays, may be used to provide greater resolution in the frequency domain.

Experimental Data

The programmable optical filter 2 was used both to suppress one sideband by acting as a blocking filter and to control the amplitude of the other sideband as shown schematically in FIG. 1B. Half of the VIPA free spectral range (FSR) was used for sideband suppression, leaving half of the FSR available for programmable filtering. Alternatively, a separate optical blocking filter (not shown) may be used. Optical measurements were taken by varying the wavelength of the tunable laser source 10 with a wavelength step size of 1 pm (125 MHz).

Figure 3:
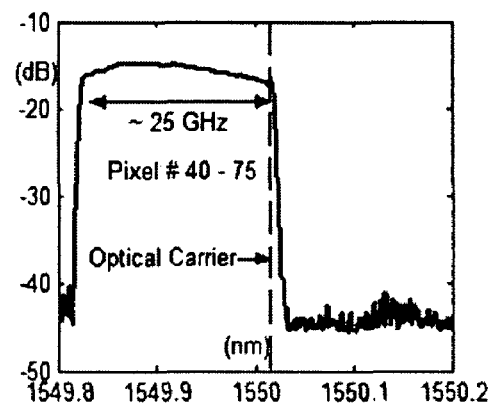
FIG. 3 shows examples of programmable optical filter characteristics based on a virtually-imaged phased-array: (a) transmission response with pixel # 40-75 turned on; (b) single pixel response vs. double or triple continuous adjacent pixels response; (c) single pixel response at three continuous adjacent pixels respectively; and, (d) optical comb-filtering.
Figure 3:
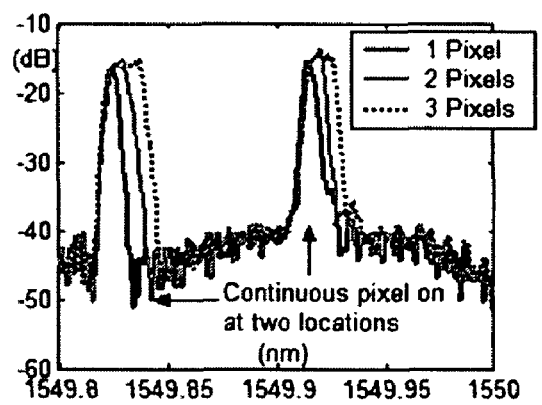
Figure 3:
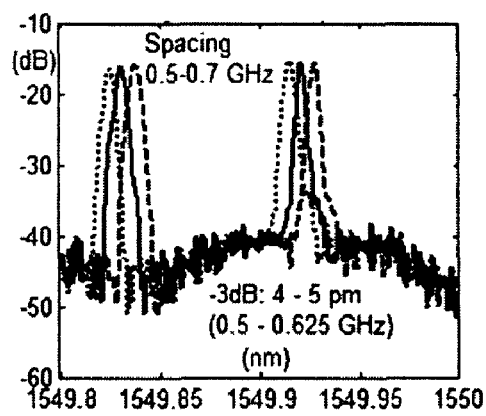
Figure 3:
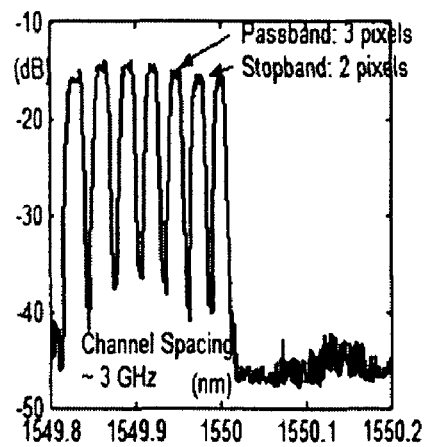

FIG. 3a shows the optical power transmission spectrum resulting from turning on pixels N=40 to N=75 of the SLM 240. The result is an optical bandpass filter with about a 25 GHz bandwidth and sharp band edges. The optical carrier wavelength is located at about 1550 nm, corresponding to pixel N=75 of the SLM 240. As the network analyzer used in the measurements had an upper frequency limitation of 20 GHz, only pixels N=45- to N=75, corresponding to about a 20 GHz bandwidth, were used. The contrast ratio (relative attenuation) between the passband and the background is greater than 25 dB, which corresponds to the sideband suppression ratio. The remaining background level may be mainly attributed to non-ideal reflections in the optical filter. The total fiber-to-fiber (input-to-output) insertion loss was about 15 dB (including ~2 dB circulator loss). Although not shown in the figures, the optical transmission characteristic repeats periodically with period of about 50 GHz (~0.4 nm).

FIG. 3b-c shows optical power transmission spectra for examples where only a few pixels in the SLM 240 are turned on, and may be used to measure the spectral resolution of the optical filter 2. In FIG. 3b, passbands consisting of one, two, or three pixels are turned on at two separate wavelengths. The transmission response with only one pixel reaches approximately the same amplitude level as that with two or three adjacent pixels turned on. This indicates that each pixel may be resolved and can independently control a small band of wavelength components. In FIG. 3c, the optical filter 2 is programmed for two separated passbands, each one pixel wide. The three different response curves are similar except for shifts of −1, 0, or 1 pixel, respectively. The pixel-to-pixel spacing is 0.5-0.7 GHz, and the −3 dB bandwidth of a one-pixel wide passband filter is about 0.5 to 0.625 GHz. The average angular dispersion is about 4 deg/nm, corresponding to an average pixel-to-pixel channel spacing of about 0.6 GHz. These optical filter properties presently limit the resolution that may be attained in microwave filtering to 500 MHz using this particular apparatus, since there is a mapping of filtering characteristics from optical to microwave domains.

FIG. 3d is an example illustrating the programmability of optical filters. Here the optical filter 2 characteristic consists of multiple flat-topped passbands (3 pixels each) separated by sharp notches (2 pixels each). The channel spacing is non-uniform, which is due to a known nonlinearity in the VIPA 220 spectral dispersion law.

The programmable optical filtering capabilities may be mapped to the electrical domain via homodyne or heterodyne conversion. This may result in a electrical filter functionality that may be measured using the microwave network analyzer 70. A homodyne process is one in which a carrier signal is present at the frequency of the carrier to which the modulation signal was applied. This is sometimes called conversion to baseband. Heterodyne detection employs a carrier signal that is of a different frequency than that of the carrier signal to which the modulation signal was applied. The resultant detected signal may therefore be translated in frequency with respect to the original modulation spectrum.

Figure 4:
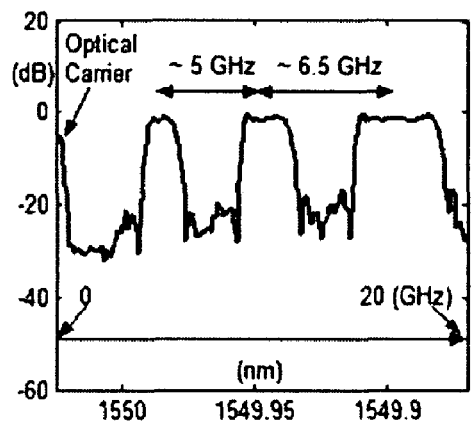
FIG. 4 shows the correspondence of optical filtering to microwave filtering: (a) optical multi-passband filtering and, (b) corresponding microwave multi-passband filtering; (c) optical notched filtering and, (d) corresponding microwave notched filtering.
Figure 4:
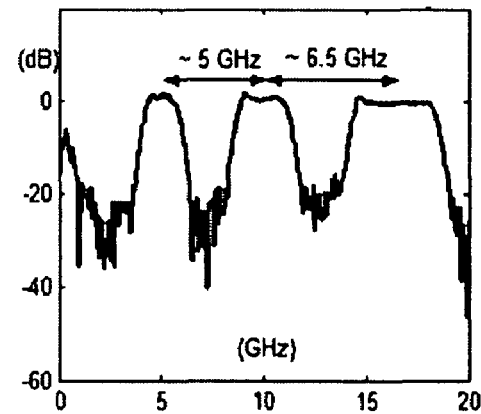
Figure 4:
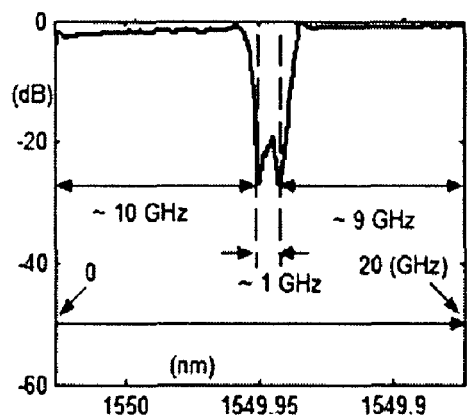
Figure 4:
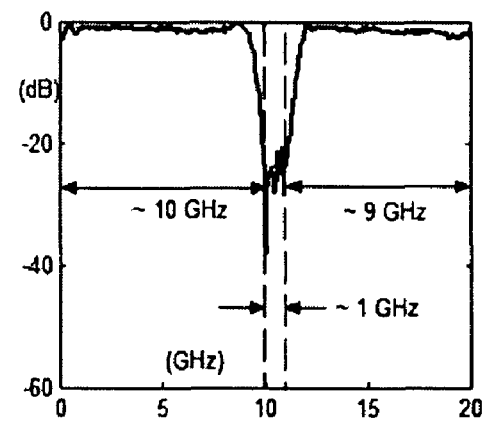

FIG. 4 shows two examples of the mapping from optical to electrical domains. The power transmission responses are plotted over a 20 GHz band. (The power transmission is normalized for comparisons; the minimum insertion loss is about 8 dB for the optical filter 2 in experimental apparatus).

FIG. 4a shows an optical filter with multiple flat-topped passbands, different passband widths and spacings, and sharp band edge transitions. FIG. 4b shows the corresponding microwave filter response after the coherent heterodyne conversion. The similarity between the optical and microwave filter shapes is evident. FIG. 4c is an example of a band-stop or notch optical filter, and FIG. 4d is the corresponding microwave filter response after the homodyne conversion or detection. Both the optical and microwave filters exhibit a similar notch with a bandwidth of about 1 GHz.

In an aspect, the notch filters of FIG. 4 may be used to shape a transmitted radio signal, or if the electrical signal applied to the modulator 20 is a received signal, the position and depth of one or more notches may be adjusted to suppress interfering signals in specific frequency intervals.

FIG. 5a is an example of stepped band-pass microwave filter with a flat-topped response, where the step depth may be controlled by programming the SLM 240. Starting with a filter with a flat approximately 10 GHz passband as a reference (dotted curve), two steps that drop down by about 10 dB, symmetrically within the passband, are programmed. Thus, optical or electrical filtering functions may be engineered for specific applications. FIG. 5b is an example of amplitude passband filtering that approximately conforms to the 3.1-10.6 GHz ultra-wideband (UWB) band defined by the Federal Communications Commission (FCC) for the radiation of electromagnetic signals. The edges of the passband may be tuned at a minimum step of 0.5-0.7 GHz corresponding to the adjacent pixel spacing in the present SLM 240.

The SLM used to obtain the experimental data presented herein was programmable; however, fixed characteristic optical filters may also be used.

Figure 5:
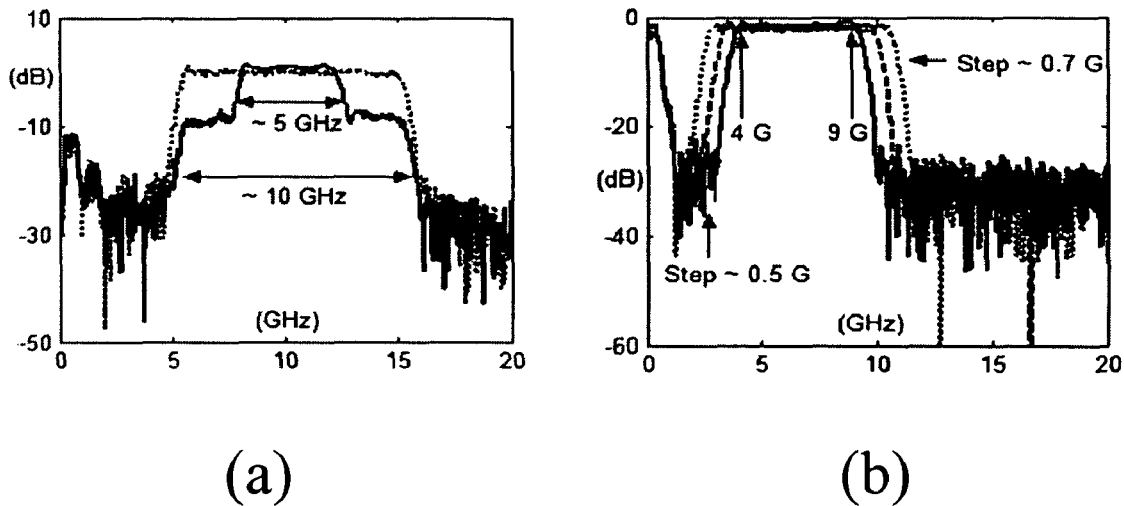
FIG. 5 shows examples of the amplitude response of microwave filters: (a) microwave band-pass filtering with stepped response, and (b) microwave band-pass filtering compatible to UWB spectral range 3.1-10.6 GHz.
Figure 6:
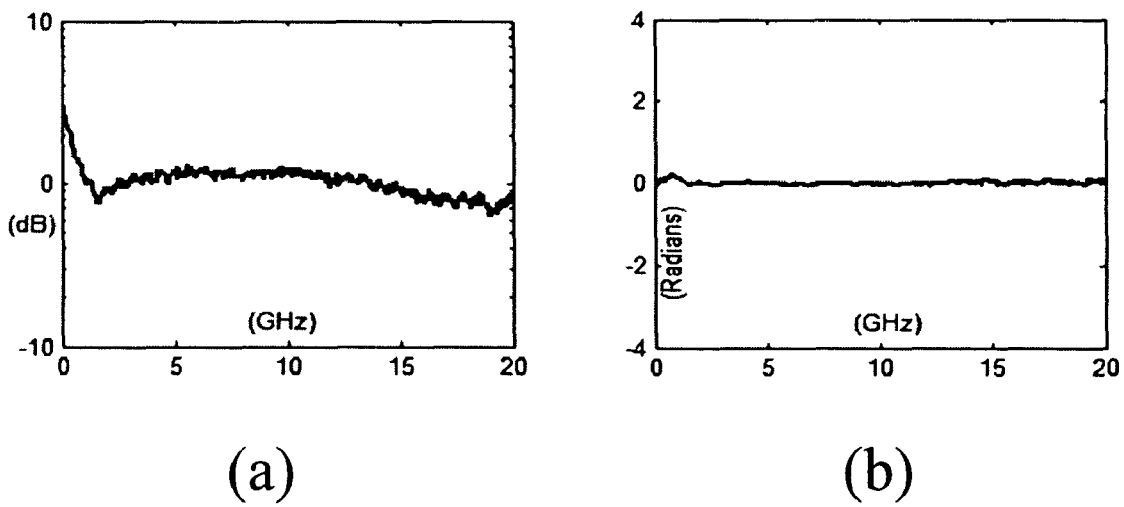
FIG. 6 shows examples of the phase response of a microwave filter: (a) all-pass power transmission without amplitude modulation, and (b) corresponding phase response (after subtraction of the linear phase) for all-pass filtering.

As is evident from equation (4), the electrical and optical phase responses are linked. Since optical pulse shapers or optical filters may be configured to be dispersion-free, a linear-phase characteristic may be achieved in the electrical response. FIG. 6a shows the microwave amplitude response when the SLM 240 is programmed for full transmission; the response is nearly flat, similar to the optical intensity response in FIG. 3a. FIG. 6b shows the corresponding microwave phase response, with the linear phase subtracted for clarity of illustration. The phase response is nearly flat over a full 20 GHz frequency range. Similar results are obtained for the filters of FIGS. 4 and 5; close to a flat phase response with frequency is observed within the passbands of the filters investigated.

A low-pass transmission region may be observed below about 600 MHz in FIG. 4b and FIG. 5. This residual low-pass response may be attributed to the passband of a single pixel that has been turned on to pass the carrier. Although the low-pass transmission may be suppressed by the optical filter, it may be further suppressed by, for example, by the use of an electrical DC blocking filter.

An EDFA 40, or other optical amplifier, may be used in the photonic portion of the apparatus to increase the signal amplitude, subject to additional noise that may result from the amplification process. Progress in optical devices optimized generally for microwave photonics applications can also be exploited to enhance the apparatus and method: for example, modulators with high linearity as well as low driving voltage, and photodiodes with high responsivity and bandwidth.

Microwave phase filtering performance may be measured using a vector network analyzer (VNA) (not shown), in place of the network analyzer 70. Various microwave spectral phase filtering results are presented. The VNA used in the experiments had a bandwidth limited to DC to 20 GHz. A group of 31 contiguous SLM pixels is used to match the 20 GHz bandwidth limitation. However, it would be apparent to a person of skill in the art that the concepts presented herein are not limited except by the specific device capabilities which may exist or which may be economically practical for a specific application.

Figure 7:
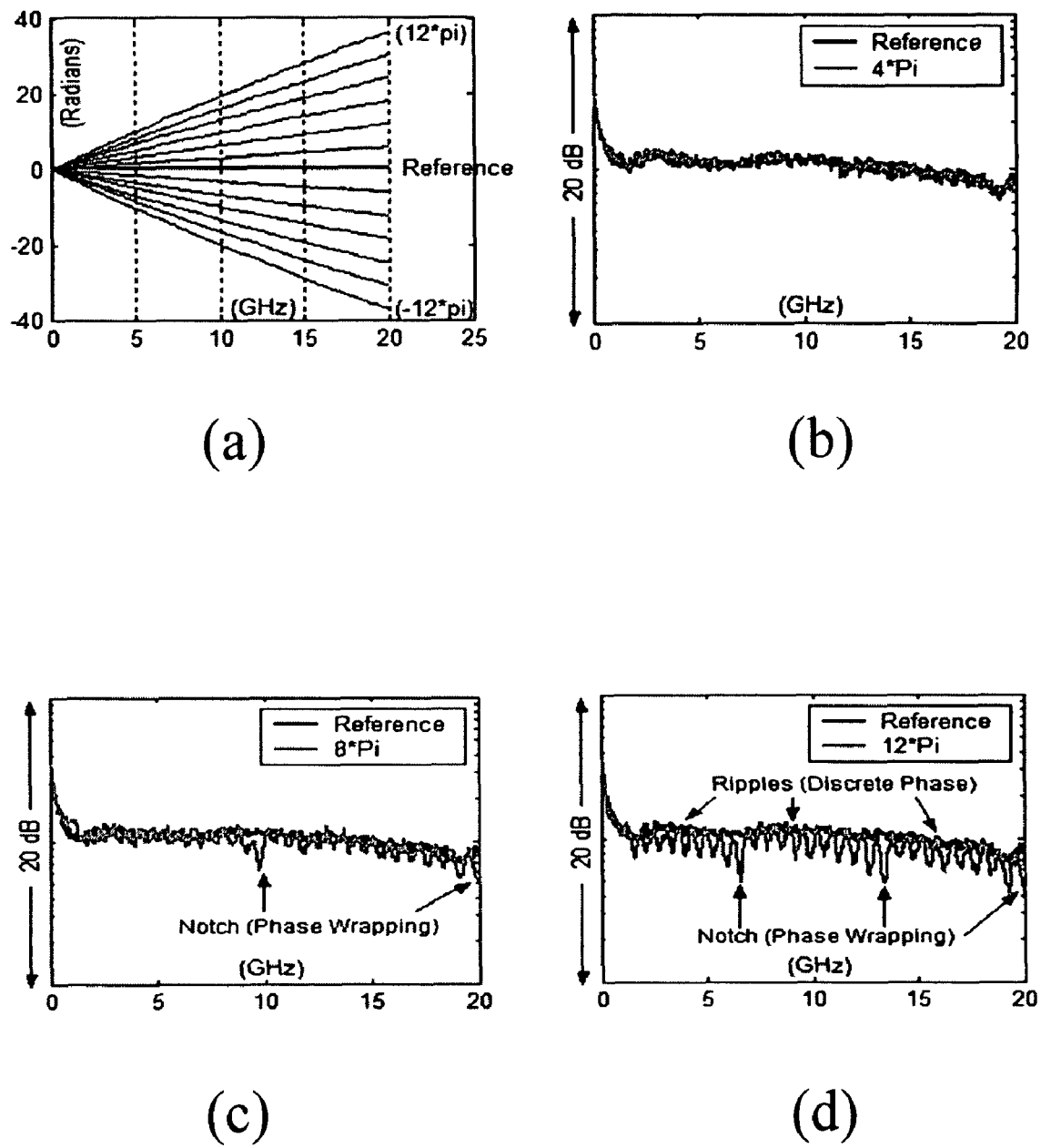
FIG. 7 shows (a) microwave linear spectral phase filtering: (b)-(d) power transmission for three linear phases with the different slopes respectively; the reference is without phase programming.
Figure 8:
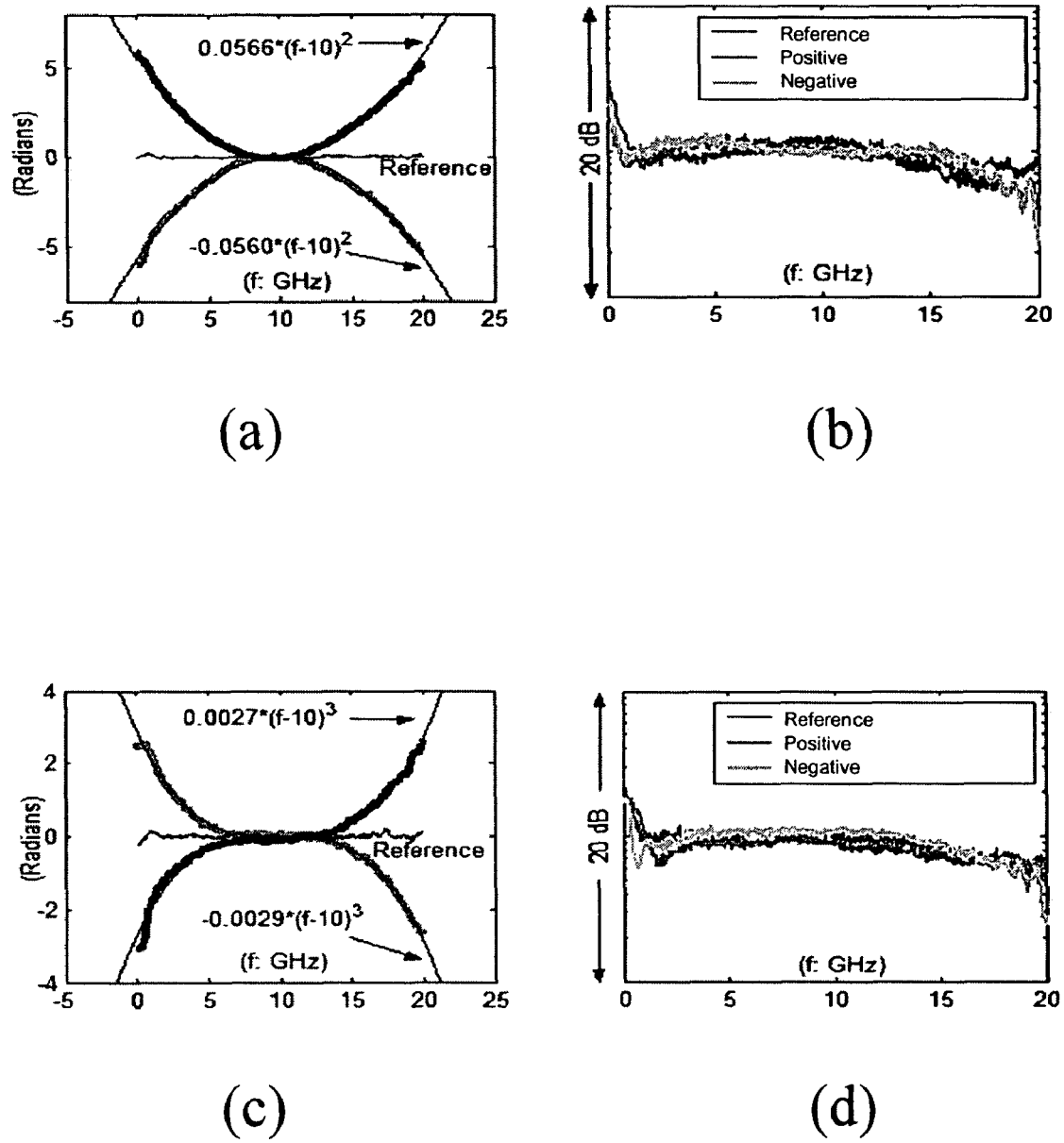
FIG. 8 shows microwave quadratic and cubic spectral phase filtering: (a) quadratic spectral phase filtering and, (b) power transmission; (c) cubic spectral phase filtering and, (d) power transmission.

FIG. 7 and FIG. 8, show data where the SLM 240 is programmed to provide purely spectral-phase filtering; that is, ideally, there is no intended attenuation of the amplitude as a function of wavelength. FIG. 7a shows a set of linear-spectral-phase filtering results, where both positive and negative phase slopes are shown. Linear phase profiles are characterized by $\Phi(N)=(N-60)/30*m\pi$ across pixels N=45 to N=75, where N is the pixel number and m is an integer. In this example, higher electrical frequencies correspond to smaller pixel numbers. The horizontal line is the reference for the case of no phase programming (m=0), and with a constant linear phase subtracted (corresponding to a time delay bias in the apparatus). The phase slope may vary from $-12\pi/20$ GHz (m=12) to $12\pi/20$ GHz (m=-12) at a step size of $2\pi/20$ GHz. The maximum slope is $12\pi/20$ GHz indicating a time delay of $-300$ ps, and the minimum slope is $-12\pi/20$ GHz indicating a time delay of $+300$ ps.

FIGS. 7b-d show examples of the microwave power response measured by the VNA. The power transmission response of three positive-slope cases ($4\pi/20$ GHz, $8\pi/20$ GHz, $12\pi/20$ GHz) are shown, in each case together with a reference curve corresponding to the power response with the SLM 240 programmed for constant phase. The negative-slope cases (not shown) are similar. For the case of $4\pi$ total phase variation, the power response is very close to the reference. However, for larger total phase variations, notches appear in the power response. The liquid crystal SLM used has a limited continuously programmable phase range, and a wrapped phase profile was applied when the range of the targeted phase profile exceeded the SLM phase range. The applied phase range was limited to $4\pi$; and for larger phase excursions phase is applied modulo $4\pi$. This leads to phase jumps of $4\pi$ at certain pixel locations. Ideally, phase jumps of $4\pi$ in a double-pass optical filter arrangement should have no effect on the amplitude; in practice, effects which may arise from discontinuities in the liquid crystal orientations may lead to notches at the locations of the $4\pi$ phase jumps. In addition, smaller phase jumps resulting from the discrete (pixelated) nature of the phase programmed onto the individual cells of the SLM may cause additional amplitude notches. These additional notches become larger for increasing phase change per pixel and are most obvious (~1.5 dB power fluctuation) in FIG. 7d where the phase change per pixel is $0.4\pi$. These additional notches arise from the finite size of individual focused optical frequency components at the SLM plane, which results in an optical filtering function that is a smeared version of the SLM spatial pattern. This leads to a phase-to-amplitude conversion process that is well understood in the pulse shaping art.

FIG. 8 illustrates some examples of nonlinear spectral phase filtering. FIGS. 8a-b show two examples of quadratic spectral phase filtering together with the corresponding power transmission spectra. A quadratic phase profile $\Phi(N)=(N-60)^2/30^2*m\pi$ (m=2 or $-2$) was programmed across pixels N=45 to N=75. Opposite signed phases are shown in black (m=2) and gray (m=-2) solid lines. The phase plot is referenced to the case of no phase programming (approximately horizontal line in plot) after subtracting a constant linear phase. In addition, numerical fits are plotted together with the VNA data to illustrate the quadratic variation. FIGS. 8c-d are examples of cubic spectral-phase filtering and the corresponding power transmission spectra. Cubic phase profiles $\Phi(N)=(N-60)^3/30^3*m\pi$ (m=1 or $-1$) were programmed across pixels N=45 to N=75. Opposite signed phases are shown in black (m=1) and gray (m=-1) solid lines. Numerical cubic fits are also plotted to illustrate cubic variation. When compared to the references, the power transmission for the quadratic and cubic phase examples exhibit relatively small deviations (<~1 dB power variations) over the full bandwidth, except at the cut-offs at DC and 20 GHz. The relatively large deviations at these cut-offs may be at least partially suppressed, for example, by extending the phase programming by a few pixels more beyond the used pixel number range, N=45 to N=75.

Figure 9:
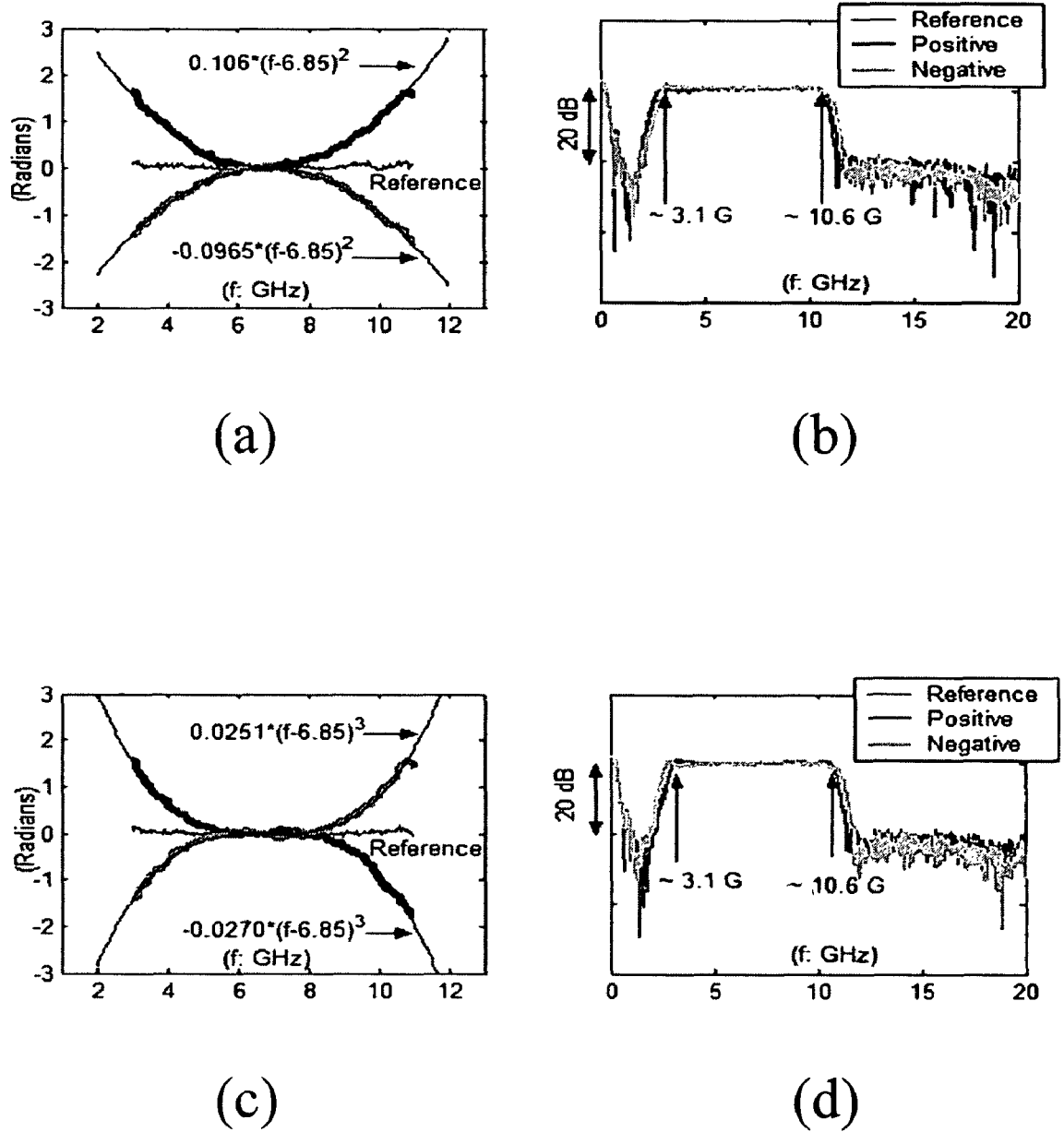
FIG. 9 shows microwave quadratic and cubic spectral phase filtering for UWB (3.1-10.6 GHz) applications: quadratic and cubic spectral phase filtering within a passband window set to the UWB band. (a) positive and negative quadratic phase responses. (b) corresponding amplitude response functions. (c) positive and negative cubic phase responses. (d) corresponding amplitude response functions. Thick lines in (a) and (c) indicate experimental data, and thin lines indicate curve fitting.

FIG. 9 shows examples of nonlinear spectral-phase filtering combined with amplitude filtering, as may be used in UWB (3.1-10.6 GHz) electrical systems. In these examples an amplitude response that may be a bandpass filter for the specified UWB band, and a quadratic or cubic spectral phase within the passband may be programmed. The data plots of FIG. 9 are organized in a similar way as in FIG. 7. In addition to the desired phase response, bandpass filters with passband variations of ~1 dB in power were generated.

In an aspect, phase filtering may be used to compensate for the characteristics of, for example antennas used in wideband communications, radar, and sensor systems. The amplitude distortions associated with frequency-dependent antenna gain, path loss and radar target cross-section may be compensated in the transmitted or received signal so as to improve such characteristics of signal-to noise ration, pulse width, signal sidelobes, and the like, and these effects may be applied either statically or dynamically. The result may be a matched filter system, whose characteristics may be determined analytically, by component measurement, or by adaptive techniques.

In yet another aspect, the characteristics of a wideband modulation signal may be modified in amplitude and phase to meet specific regulatory or technical requirements for signal bandwidth, resolution, peak-to-average power, and the like, using Fourier transform or other techniques of computation, characterization or measurement.

Figure 10:
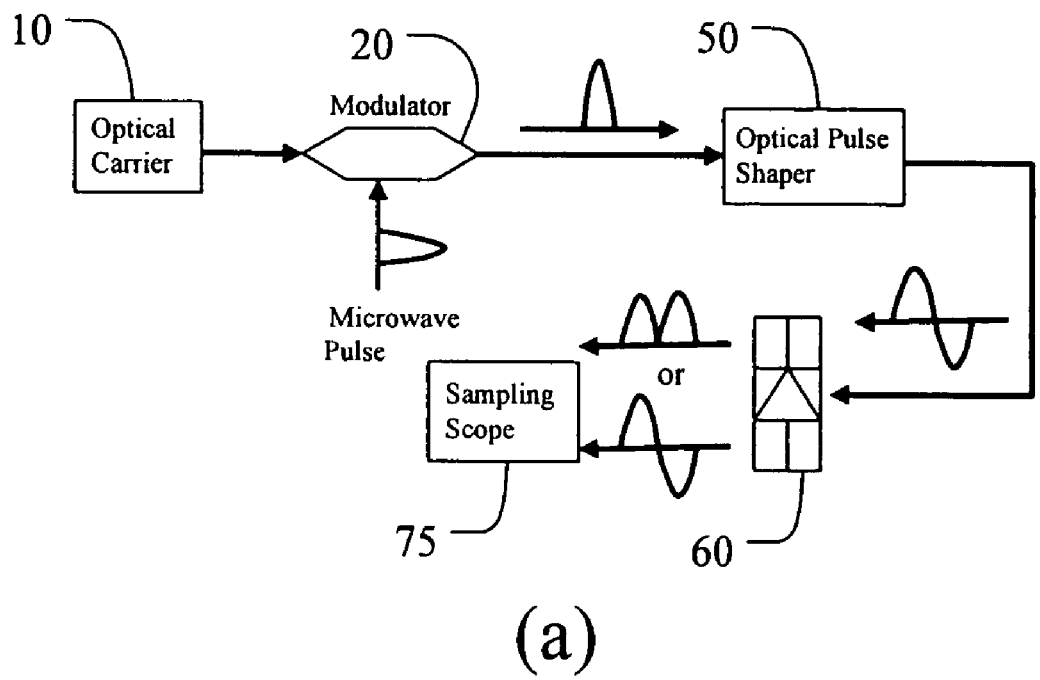
FIG. 10 shows (a) a schematic layout of photonic spectral phase shaping apparatus for microwave pulses, resulting in microwave waveform synthesis, illustrating coherent (b) and incoherent (c) operation.
Figure 10:
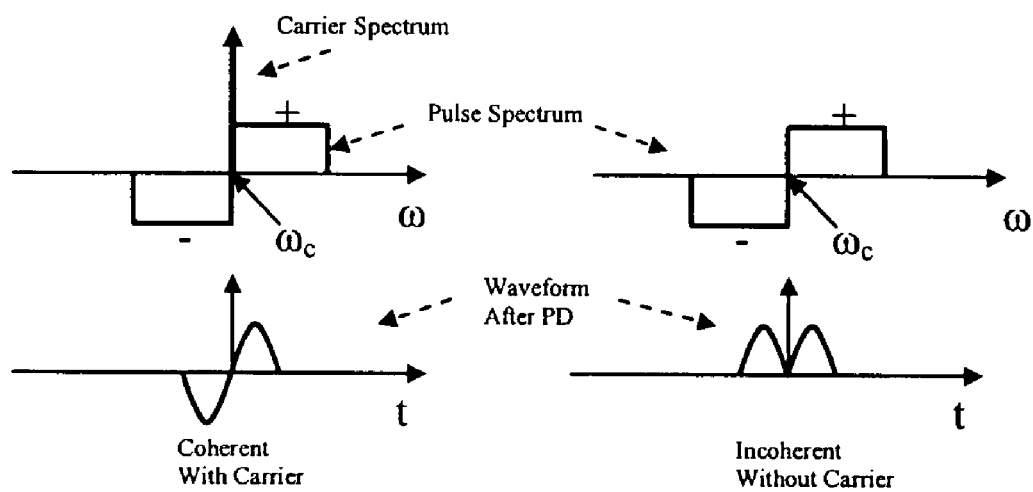

When used with a pulsed microwave modulation source, the apparatus of FIG. 10 may be used to produce a shaped wideband pulse. The optical carrier input signal 10 is applied to the Mach-Zehnder modulator 20 (30 GHz electrical modulation bandwidth) which is driven by a pulsed UWB electrical signal (~30 ps duration full-width at half-maximum, zero frequency to ~20 GHz electrical bandwidth). The pulsed drive signal has a peak voltage of ~200 mV, which intentionally kept below the voltage ($V_\pi$=5V) required to drive the modulator output to zero. This results in a substantially linear modulation response, such that the Fourier spectrum of the electrical driving pulse is transferred directly into the optical domain. The resulting optical spectrum is centered about a narrowband carrier, representing the portion of the input optical signal that is not modulated (FIG. 10b). The intensity of the narrowband carrier with respect to the broadband pulse-modulated spectrum may be controlled through a bias voltage $V_b$ applied to the modulator. When $V_b=V_\pi/2$, the carrier intensity exceeds that of the modulated optical signal component, and with $V_b=V_\pi$, the carrier is completely suppressed (FIG. 10c). In either case, the output signal from the modulator is processed by, in this example, a Fourier transform pulse shaper which may be an optical filter 2, such as is shown in FIG. 2, which imposes a desired phase versus frequency characteristic onto the optical spectrum.

The optical signal was then directed onto a fast photodiode 60 (60 GHz electrical bandwidth), which functions as the opto-electrical (O/E) converter, and the resulting electrical waveform measured (after a DC blocking filter in the case of coherent heterodyne detection) on a sampling oscilloscope 75 with a 50 GHz electrical bandwidth. Optical amplifiers (not shown) were used to adjust the power level incident onto the photodiode 60. When a strong carrier wave signal is present, homodyne beating arising from coherent interference between the optical carrier and the modulated optical field components dominates. In this case, optical phase information is transferred coherently into the electrical domain (FIG. 10(b)).

Since photodiodes convert directly from optical power to electrical current, direct detection (which occurs when the carrier is suppressed, A=0, FIG. 10(c)) yields unipolar electrical waveforms and the optical phase information is lost in the incoherent transformation process.

Figure 11:
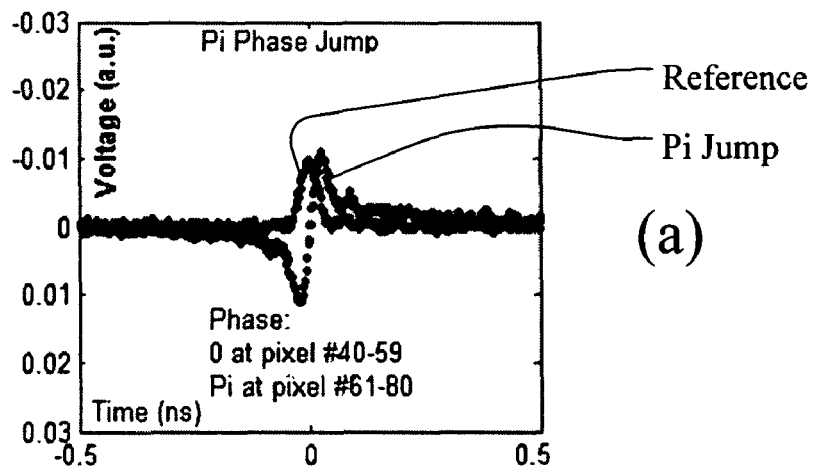
FIG. 11 shows electrical doublet pulses generated by insertion of a π phase jump onto the optical spectrum: (a)-(b) are coherent optical-to-electrical conversion in presence of strong carrier wave; (c) is incoherent optical-to-electrical conversion with suppressed carrier.
Figure 11:
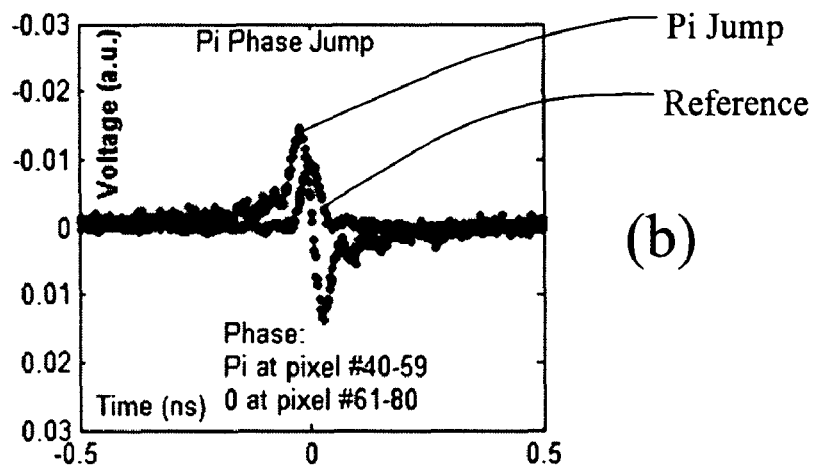
Figure 11:
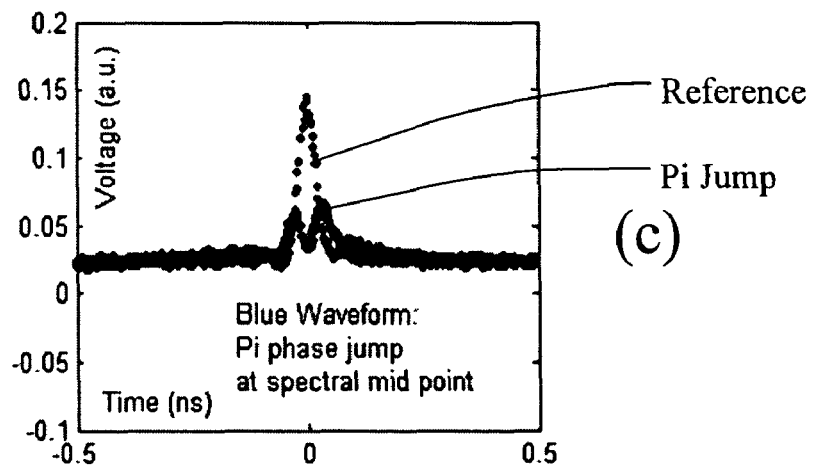

FIG. 11a-b show shows the electrical waveform generated after opto-electric (O/E) conversion, in the strong carrier wave case ($V_b=V_\pi/2$), which may be used in ultra-wideband (UWB) waveform synthesis. Half of the optical spectrum is programmed for 0 phase shift and half for $\pi$ phase shift. This phase shift pattern results in an optical field that is anti-symmetric in frequency; the field amplitude changes sign at the center of the spectrum, as in FIG. 11a. According to the inverse Fourier transform relationship, the resulting waveform in the time domain is a pulse doublet, with a phase reversal between the pulses: an odd function of time. The electrical waveform is a bipolar, odd function of time corresponding to a single electrical cycle at about 10 GHz. A similar example is shown in FIG. 11b, except that the SLM 240 is programmed such that the 0-phase and $\pi$-phase portions of the optical spectrum are interchanged. Both the polarity of the spectrum and of the resulting time-domain waveform are changed when compared to FIG. 11a. Again, a single electrical cycle is generated, but now with an initial positive voltage, in contrast to the initial negative voltage in FIG. 11a.

FIG. 11c shows data for the same optical filter function as in FIG. 11a, but the optical signal has a suppressed carrier ($V_b=V_\pi$). In this operating regime, the square-law characteristic of the photodiode yields an electrical output proportional to the time-dependent optical power and the detection is incoherent. This results in a unipolar electrical output which is still a pulse doublet, but is an even function of time, with no phase reversal.

In another example of waveform synthesis, the optical pulse shaper 2 is used to generate a cubic spectral-phase function. Specifically, the SLM 240 was programmed for a phase profile $\psi(n)=\pm 2\pi[(n-60)/20]^3$ for pixel numbers N in the range 40 to 80. A cubic spectral phase results in an asymmetric waveform with an oscillatory tail appearing on one side of the main pulse (the side depending on the sign of the cubic phase). This effect may be understood through the well known relation $$\tau(\omega) = \frac{-\partial \psi(\omega)}{\partial \omega} \quad (5)$$

that relates the dispersion, that is, the frequency-dependent group delay function $\tau(\omega)$ to the derivative of frequency-dependent phase with respect to angular frequency $\omega$. For the cubic phase case, $\tau(\omega)$ is quadratic, and the dispersion broadens the pulse asymmetrically towards either positive time or negative time, depending on the sign of the cubic phase. Furthermore, the quadratic dispersion function imparts the same time shift to low and high frequency components as long as they are offset equally from the center frequency, and these components can interfere with each other to yield a ringing in time.

Figure 12:
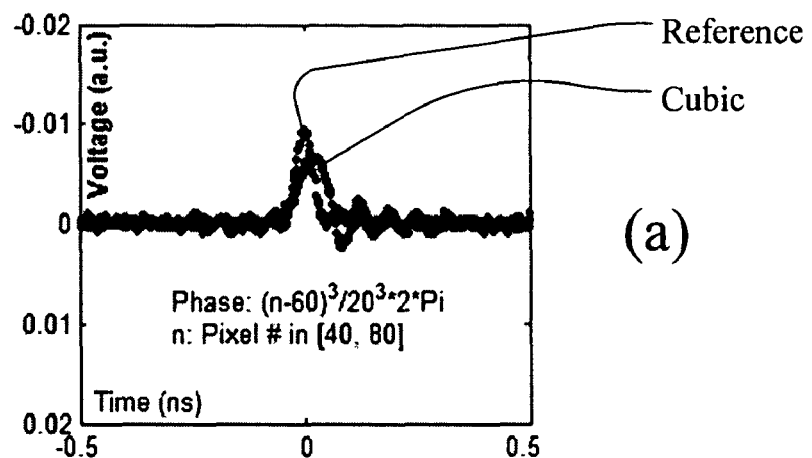
FIG. 12 shows electrical pulse shaping via cubic spectral phase and coherent detection: (a) and (b) show an asymmetric pulse distortion with a damped ringing tail; and, (c) electrical true-time-delay by linear spectral phase shaping.
Figure 12:
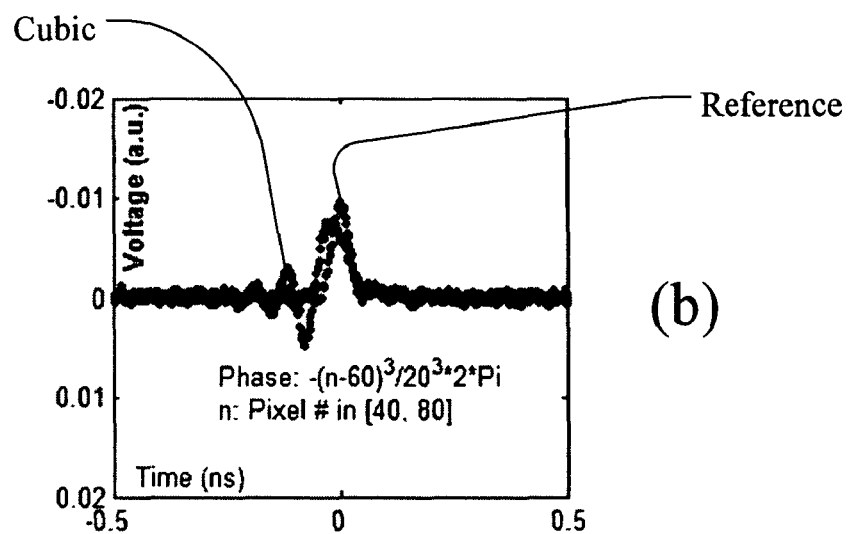
Figure 12:
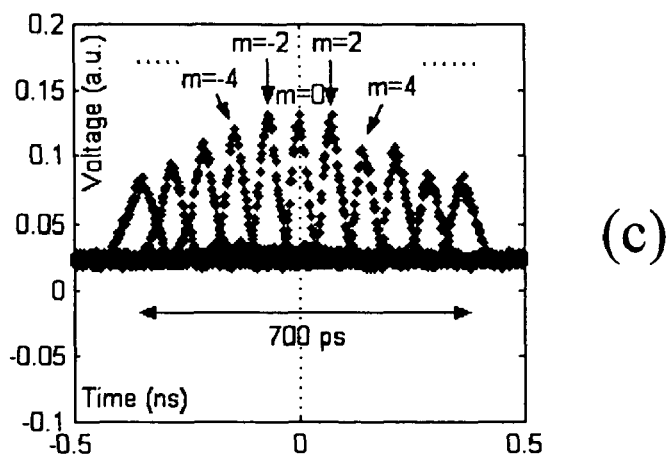

Data are shown in FIG. 12 a-b in the electrical domain, for the two signs of cubic phase, in the strong carrier wave (fully coherent) regime. The observed asymmetric distortions closely resemble the analogous waveform distortions known in ultra-fast optics and, as expected, the change in the sign of phase reverses the sense of the time axis relative to the waveform asymmetry.

In another example, programmable control of time delay is performed. A frequency-independent time delay corresponds to a linear-phase function in the frequency domain. Accordingly, the output signal may be shifted forward or backward in time by programming the SLM 240 with appropriate linear-phase functions. Techniques for achieving such true-time-delays may be used, for example, for wide instantaneous beam steering of phased array antenna systems.

FIG. 12c shows further experimental results. Data are shown for eleven different cases, where the SLM 240 is programmed for a phase profile $$\psi(n) = \frac{m\pi(n-60)}{20},$$

for m=−10, −8 ... 0 ... 8, 10 and pixel numbers N in the range 40 to 80. The data shown are for the case of incoherent operation, although comparable results are obtained with coherent homodyne O/E conversion. The case m=0, for which the SLM 240 is effectively deactivated, is taken as the time reference (t=0 in plot); in this way, fixed delays associated with propagation through the optical filter or pulse shaper, and optical and electrical cables are compensated. Each of the traces is shifted to a distinct time position, either forward or backward in time depending on the sign of m. A time shift between adjacent pulses of $(2\pi/20)/(2\pi*0.7\text{ GHz}) \approx$ 71 ps, and total time delay of 710 ps is expected. The experimental results show 700 ps total time delay, approximately 15 times the duration of the individual pulse widths (45 ps for the m=0 pulse), with minimal distortion. The small pulse broadening observed for the larger time shifts is attributed to curvature in the VIPA spectral dispersion function, which was not taken into account in programming the SLM 240 of the optical filter 2 in this experiment.

The programmable increases or decreases in propagation time obtained by using the present apparatus rely on a parallel manipulation of frequency-dependent optical phase. The ability to displace a pulse over a time range exceeding its duration by more than an order of magnitude (either in the optical or in the electrical domain) with little distortion, is far superior to results reported in slow/fast light experiments, where strong frequency-dependent loss or group velocity dispersion associated with resonant structures has usually limited the range of operation to time delays on the order of the pulse duration or less.

An example of the use of photonic spectral filtering in a system is shown in FIG. 13a-b. Depending on the specific apparatus and control software, this system may be considered to be a telecommunications system, a radar system or the like.

The apparatus of FIG. 13(a) may be a transmitter system 3 having an optical source 10, E/O modulator 20 and optical filter 2 as previously described. The output of the optical filter 2 may be E/O converted in a photodiode 60 and input to a transmitter 420. The transmitter may be a broadband radio amplifier, where the bandwidth of the amplifier 420 is at least equal to the bandwidth of the signal produced by the combination of an electrical waveform generator 30 as modified by the optical filter 2. The characteristics of the optical filter 2 may be controlled by a waveform control device 480, which may be a computer which may vary the control of the optical filter 2 in a fixed or time varying manner. The waveform generator may produce a series of short pulses or other amplitude or phase modulated signal whose characteristics are imposed on the optical signal, as previously described. The output of the transmitter 420 may be radiated as an electromagnetic signal by an antenna 430.

The apparatus of FIG. 13b may be a receiver system 4 having a radio receiver 450, which may be a broadband electronic amplifier whose output is applied as the modulating signal to an E/O modulator 20. The output of the E/O modulator may be processed in the optical filter 2, so as to adjust the characteristics of the signal spectrum, under the control of a waveform controller 480, which may apply a fixed or time variable control to the optical filter 2. The output of the optical filter 2 is detected in the photodiode 60 so as to convert the optical signal again into the electrical domain, and the electrical signal may be further processed by electrical filtering and amplification (not shown), before being detected in a detector 470, which may also include a display (not shown) or be input to a signal or data processor. The optical signal for the E/O modulator 20 may be supplied by the same or similar optical source 10 that was used in the transmitter system. The wavelength of the optical source used in the transmitter system 3 and the receiver system 4 may not be the same wavelength if a frequency translation of the modulated waveform is desired, such as where a non-zero receiver intermediate frequency may be used to minimize DC- offset effects or where further coherent processing may be desired. Depending on the type of system being configured, various components such as the antennas, optical source, and the like, may be shared if the components are collocated.

Although only a few exemplary embodiments of this invention have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. An apparatus for filtering a waveform, comprising:
   an electro-optic modulator adapted to accept a first optical signal and an electrical modulating signal;
   an optical filter having a plurality of filter bandwidths spaced apart in wavelength and adapted to accept an output of the modulator and to modify at least one of an amplitude or phase of the modulator output within a bandwidth of the electrical signal; and
   an opto-electronic converter.

2. The apparatus of claim 1, wherein the first optical signal is present at the opto-electronic converter.

3. The apparatus of claim 1, wherein the opto-electronic converter is a photodiode.

4. The apparatus of claim 1, wherein the first optical signal is provided by a laser.

5. The apparatus of claim 4, wherein the laser is one of a fiber laser or a semiconductor laser device.

6. The apparatus of claim 1, wherein the first optical signal is a constant amplitude coherent signal, and a portion of the first optical signal is provided at the opto-electronic detector, with an amplitude such that the output of the optical filter is substantially coherently detected.

7. The apparatus of claim 1, wherein a second optical signal is provided at the opto-electronic detector.

8. The apparatus of claim 7, wherein the amplitude of the second optical signal results in substantially coherent detection of the output of the optical filter.

9. The apparatus of claim 7, wherein a wavelength of the second optical signal is different from a wavelength of the first optical signal.

10. The apparatus of claim 1, wherein the modulating signal is a substantially constant amplitude microwave signal.

11. The apparatus of claim 1, wherein the modulating signal is a pulsed microwave signal.

12. The apparatus of claim 1, wherein the optical filter is a programmable optical filter.

13. The apparatus of claim 12, wherein the optical filter is programmable in at least one of wavelength or phase.

14. The apparatus of claim 12, wherein the programmable optical filter further comprises a plurality of pixels arranged in an array.

15. The apparatus of claim 14, wherein the array is a one dimensional linear array.

16. The apparatus of claim 14, wherein the array is a two dimensional array.

17. The apparatus of claim 12, wherein the array is a plurality of liquid crystal elements.

18. The apparatus of claim 1, wherein the optical filter further comprises:
   a wavelength dispersive optical element; and
   a spatial optical modulator.

19. The apparatus of claim 18, wherein the wavelength dispersive optical element is a diffraction grating or a virtual imaged phased array (VIPA).

20. The apparatus of claim 18, wherein the spatial optical modulator is a liquid crystal phase shifter having spatial elements, the phase shift of at least two of the elements being controllable.

21. The apparatus of claim 18, wherein the optical filter is configured as a reflective device having a mirror disposed on a side of the spatial modulator opposite from that facing the wavelength dispersive optical element.

22. The apparatus of claim 18, where the optical filter further comprises:
a virtual imaged phased array (VIPA);
wherein the spatial optical modulator is disposed at a focal plane of a light path.

23. An apparatus for transmitting electrical signals, comprising:
an optical source;
an electrical modulating signal;
an apparatus as claimed in claim 1; and
an electronic amplifier.

24. That apparatus of claim 23, further comprising an antenna.

25. An apparatus for receiving electrical signals, comprising:
an electronic amplifier;
an optical source; and
an apparatus as claimed in claim 1.

26. The apparatus of claim 25, further comprising an antenna.

27. An apparatus for producing electrical waveforms, comprising:
an electro-optical modulator configured to accept a first optical signal and an electrical signal;
an optical filter having a plurality of substantially independent filter elements spaced apart in wavelength that varies at least one of the amplitude or phase of an optical output signal of the electro-optical modulator as a function of wavelength within the bandwidth of the electrical signal; and
an opto-electronic detector.

28. The apparatus of claim 27, wherein the input to the opto-electrical detector is an output signal from the optical filter and a second optical signal.

29. The apparatus of claim 28, where the second optical signal is a substantially continuous wave optical signal.

30. The apparatus of claim 27, wherein the optical filter has a wavelength resolution such that at least two spectral portions within the bandwidth of the electrical signal may be substantially independently varied.

31. The apparatus of claim 30, wherein the optical filtering is time varying.

32. The apparatus of claim 27, wherein the first optical signal is a substantially continuous wave output signal of a coherent optical source.

33. The apparatus of claim 27, wherein the first optical signal and the second optical signal are derived from a common optical signal.

34. The apparatus of claim 27, wherein the variation of the at least one of the amplitude or phase is on a wavelength scale equivalent to a spatial resolution of a spatial modulator component of the optical filter.

35. The apparatus of claim 34, wherein the variation is a function of time.

36. The apparatus of claim 27, wherein the optical filter has a wavelength resolution such that at least two optical spectral portions within the bandwidth of the electrical signal may be substantially independently varied.

37. The apparatus of claim 36, wherein an individual resolution element of a spatial modulator component of the optical filter is capable of introducing a phase shift of at least $2\pi$.

38. The apparatus of claim 27, wherein the opto-electronic detector performs a coherent detection of an optical signal output of the optical filter.

39. The apparatus of claim 27, wherein the opto-electronic detector performs a non-coherent detection of the optical signal output of the optical filter.

40. The apparatus of claim 27, wherein the electrical signal is a pulsed microwave signal.

41. A method of filtering an electrical signal, the method comprising:
providing an electro-optical modulator adapted to accept an optical signal and an electrical modulating signal;
optically filtering the modulated optical signal, where the optical filter characteristics include a plurality of filters spaced apart in wavelength within a bandwidth of the electrical modulating signal; and
detecting the filtered optical signal.

42. The method of claim 41, wherein the electrical modulating signal is time shifted by optically filtering the modulated optical signal so as to introduce an additional linear phase shift as a function of wavelength.

43. The method of claim 41, wherein the time shift is either positive or negative depending on the sign of the additional linear phase shift.

44. An apparatus for generating electrical signals, comprising;
means for modulating an optical signal with an electrical signal;
means for modifying an optical spectrum of the modulated optical signal; and
means for detecting the modified modulated optical signal.

45. An apparatus for filtering a waveform, comprising:
an electro-optic modulator adapted to accept a first optical signal and an electrical modulating signal;
an optical filter adapted to accept an output of the modulator and to modify at least one of an amplitude or phase of the modulator output within a bandwidth of the electrical signal; and
an opto-electronic converter,
wherein the optical filter further comprises:
a wavelength dispersive optical element; and
a spatial optical modulator having a spatial resolution such that a plurality of independently controllable filter bandwidths are formed within the bandwidth of the electrical signal.

* * * * *